Patented Dec. 10, 1940

2,224,695

UNITED STATES PATENT OFFICE 2,224,695

INHIBITOR

Carl F. Prutton, Cleveland Heights, Ohio

No Drawing. Application November 25, 1938,
Serial No. 242,419

10 Claims. (Cl. 148—6.5)

This application is a continuation-in-part of my co-pending application Ser. No. 99,165, filed September 2, 1936.

The present invention relates to the art of treating metal and is particularly directed to an improved method of the treatment of metal surfaces to prevent corrosion and rust.

Many attempts are known in the prior art to provide rust and corrosion inhibitors for metals but these efforts heretofore have either proved unsatisfactory or too expensive in practice to warrant their wide commercial adoption.

The general objects of this invention are to provide a coating composition which is very simple in its use and application; one that is usable for metals directly without preliminary treatment or finishing operations; a compound which is inexpensive and generally reduces the cost of coating metal and a novel method to improve the art of inhibiting metals from corroding or oxidizing.

The specific object hereof is to provide a compound which will react with the metal to which it is applied to efficiently protect the surface of such metal and effectively prevent oxidation and corrosion.

In accordance with the present invention I have discovered that certain derivatives of acids of phosphorus in non-aqueous media are readily applicable to metal surfaces to inhibit corrosive action. For certain purposes the derivatives used are preferably of such nature that in contact with aqueous media they will yield a solution having a pH of below 7, my research and tests showing the most satisfactory results to be when the pH is between 4 and 6, in most cases.

In practicing my invention, I have found that many derivatives of the acids of phosphorus are sufficiently active under favorable conditions to react chemically with metal surfaces to form adherent protective coatings.

A further advantage of the present discovery is the compatibility of certain derivatives of the acids of phosphorus in relatively pure state with oils and with vehicles used in coating materials, such as paints, varnishes, lacquers; and with other solvents partly or wholly immiscible with water. This is especially valuable in carrying out the invention as the corrosion inhibiting compound may be included in ornamental or preservative coating mixtures and applied to the surface to be treated without an extra operation. Still further, it has been found that the affinity of phosphorus compounds with paint, varnish, and lacquer coating materials generally improves the resulting coating and provides an effective bond or adherence thereof to the surface of the metal due to the reaction of such compounds with the metal.

In practice, a metal surface may be treated with a derivative of acids of phosphorus in an oil or other carrying vehicle to provide a thin coating on such surface. One very effective method comprises heating a coating liquid to a suitable temperature, immersing the article to be protected, and then cooling or drying in air the thin adherent coating upon the article which resulted from the bath. The drying may be accelerated by placing the coated article in a suitable oven.

As examples of the new and preferred class of inhibitors and included within the scope of the present invention are the ester and ester-salt derivatives of the acids of phosphorus. Also included are certain of the organic derivatives of such acids, which derivatives may be of the aliphatic or aromatic type, and which derivatives will also have a pH of less than 7, preferably between 4 and 6. Specific examples of inhibitors contemplated by this invention are:

Tricresyl phosphate
Diphenyl phosphoric acid
Mono diphenyl phosphoric acid
Dilauryl phosphoric acid
Mono lauryl phosphoric acid
Mono-, di-, and tri-esters of:
    (Ortho) phosphoric acid
    Thio-phosphoric acid
    Phosphorous acid
    Thio-phosphorous acids
    Hypo-phosphorous acids
Mono-, di-, tri-, and tetra-esters of:
    Pyro-phosphoric acid
    Pyro-phosphorous acid
    Thio-pyro-phosphoric acids
    Thio-pyro-phosphorous acids
Mono-, and di- esters of:
    Hypo-phosphoric acid
Esters of:
    Meta-phosphoric acid
    Meta-phosphorous acid
    Thio-meta-phosphoric acids
    Thio-meta-phosphorous acids
Phenyl meta phosphate
Dichlor diphenyl phosphoric acid
Mono-tolyl phosphoric acid
Dinaphthyl phosphoric acid
Dichlor dinaphthyl phosphoric acid
Diethyl phosphoric acid
Dibutyl phosphoric acid
Tri-isobutyl phosphate
Diphenyl phosphorous acid
Diphenyl pyro-phosphoric acid
Sodium phenyl phosphoric acid
Lead phenyl phosphoric acid
Lead diphenyl phosphate
Lead dilauryl phosphate
Mono-ethyl phosphite
Di-ethyl phosphite
Mono-, di-, and tri-phenyl phosphites Mono-, di-, and tri-aryl phosphites
Tri-ethyl phosphite
Tetra-ethyl ester of pyro-phosphoric acids
Ethyl meta phosphate
Mono-ethyl phosphoric acid
Mono- and di-thio-pyro-phosphoric acid derivatives
Mono- and di-thio-meta-phosphoric acid derivatives
Diphenyl thio-phosphoric acid
Diphenyl thio-phosphorous acid
Diphenyl thio-pyro-phosphoric acid
Phenyl meta-thio-phosphate
Ethyl thio-phosphite
Tri-ethyl thio-phosphite
Ethyl thio-meta-phosphate
Mono-ethyl thio-phosphate
Di-ethyl ester of tetrathiophosphoric acid and salts derived from any of the above-identified acid esters.

The inorganic-organic or thio inorganic-organic derivatives of the acids of phosphorus and of the acid salts thereof fall also within the general class of compounds and are useful to produce the present inhibitor. By way of example the following are cited:

Sodium phenyl phosphoric acid
Lead phenyl thio-phosphoric acid
Lead diphenyl phosphate
Lead dilauryl phosphate In the above thio acids or salts, sulphur may be substituted for any or all of the oxygen atoms; organic or inorganic radicals for any or all hydrogen atoms; and metals for any or all hydrogen atoms to produce products which are useful for my purpose.

Other examples are found in certain metal and organic phosphides such as copper phosphide or silver phosphide, triphenyl phosphide, phenyl-lead phosphides.

This invention also contemplates the use of derivatives of the acids of phosphorus in which an organic radicle is substituted for a hydroxyl group of the original acid, that is, in which a carbon atom is directly attached to a phosphorus atom; for example:

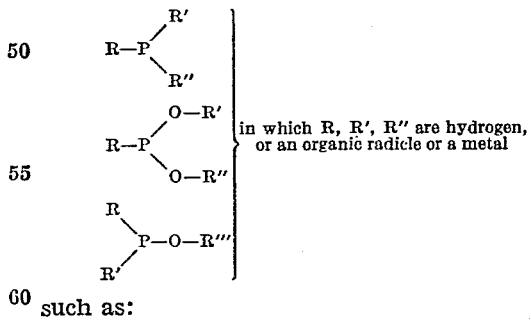
in which R, R', R" are hydrogen, or an organic radicle or a metal such as:

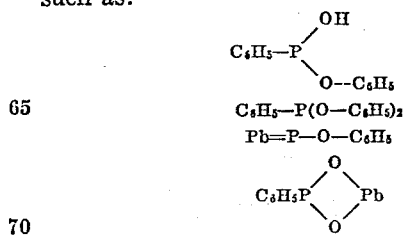

Still further compounds of the herein disclosed general class are the metallic or organic phosphomolybdates, phosphotungstates, ammonium phosphomolybdates and monoethyl phosphomolybdates.

With many of the foregoing acids of phosphorus it is to be noted that one or more of the hydrogen atoms may be replaced by organic or inorganic radicals and one or more of the hydrogen atoms may be replaced by a metal or metallic radical, such as metallic oxide, and thus form a single compound useful for my purpose. Illustrative thereof are:

Cuprous monobutyl phosphite and
Cupric monophenyl trithiophosphite

In this specification it is to be understood that the term "radical" is used to denote not only a group of atoms which can enter into a compound without undergoing decomposition, but a single radical such as one containing one or more atoms of a single element in contrast with the "compound radicals."

The invention is capable of adaptation or practice in many varied forms and methods and the following are recited as illustrative embodiments of the same and not limitative of the scope thereof:

*Example 1*

The inhibiting compound consisting of the approximate mix of 5% diphenyl phosphoric acid and 95% of a refined mineral oil (about 180 S. U. S. at 100° F.) which is heated to a temperature of about 180° C., has been found very satisfactory in treating steel sheets. The metal sheets or articles are dipped into the heated admixture where such compound attacks the surface of the metal to apply thereto a protective coating, and thereupon the metal article is removed from the bath and the surplus compound may be either wiped off or dried by air or heat to remove the oil vehicle. It will be understood that the diphenyl phosphoric acid has, during this process, attacked the surface of the metal and reacted chemically therewith to provide a homogeneous protective layer having pronounced corrosion-resisting properties.

As a result of the foregoing treatment of the metallic sheets it was found that the surface of such sheets had thereon an intimate strongly adherent coating which proved to be organic iron phosphate, the aforesaid diphenyl phosphoric acid having directly contacted the surface of the metallic sheets and having reacted therewith to produce upon the outer surfaces of such sheets this layer of organic iron phosphate.

It should be manifest that the very nature and formation of this protective coating is so intimately joined or alloyed to the surface of the metal as to be inseparable therefrom and hence, assured of its durability. The improved protective coating prevents the oxidation or corroding of the metal and is sufficiently ductile to permit certain working of such metal.

*Example 2*

An inhibiting compound is prepared by dissolving 0.25% tricresyl phosphate in a mineral lubricating oil (Penna. bright stock).

*Example 3*

An inhibiting compound is prepared by dissolving 0.25% of tri-isobutyl phosphate in bright stock.

A like admixture of diphenyl phosphoric acid and oil, may be used to treat the surfaces of metallic articles in either heated or unheated condition. When the bath is unheated, the article dipped therein may require a slightly longer period of immersion and the method of drying may be slightly varied, such as by subjecting the coated article to heat to accelerate the chemical reaction of the compound with the metal itself. Many of the herein disclosed compounds are sufficiently acidic in nature to attack the metal without any heat or other accelerative aid.

The above examples are directed to the practice of the present invention in the mere surface treatment of metals to effectively prevent corroding or rusting thereof. Obviously, such metals may, thereafter, be used in any desired manner or may be ornamented or treated with other coating compositions, as for example, paints and lacquers.

The invention contemplates also the admixture of the above derivatives of the acids of phosphorus directly in certain paint, varnish, lacquer or enamel compositions, or other solvents partially or wholly immiscible with water. In employing the invention in such manner I have discovered that when a metallic surface is treated with a paint or the like, including one of the above derivatives of the acids of phosphorus, a very similar result is obtained to that described above in connection with Examples 1, 2 and 3. In other words, it is found that the said derivatives of acids of phosphorus attack the metal surface being treated and produce the same reactionary effect regardless of the paint vehicle carrying such materials and thus provides an effective adherent organic protective coating on such metal.

As stated herein, the novel coating compound is preferably carried in non-aqueous media, such as petroleum oils and solvents, fatty oils, greases, waxes, or other organic solvents, or mixtures of the above such as are used as vehicles for paints, varnishes, lacquers, etc. Such compound will then react by itself or in contact with water or air with the surface of the metal to which the coating is applied, to produce thereon a protective coating. This coating consists of the reaction product of the metal and the acidic constituent of the compound. It has been found that certain of these compounds of phosphorus will attack the metal and produce a roughening of the metal and thereby greatly increase the adherent properties of such metal when an ornamental coating is applied thereto.

The invention also contemplates combining with the compound of phosphorus an organic derivative of an inorganic acid, e. g. sulphuric acid, silicic acid, nitric acid, or the like. These hydrolizing agents are found to accelerate the attack on the metal surface and to greatly enhance the properties of such surface to hold coatings thereon.

Examples of the above mentioned organic derivatives of inorganic acids are:

Ethyl silicates
Phenyl sulphonic acid
Ethyl sulphuric acid
Lauryl sulphuric acid
Aniline sulphate An example of the combination of one of the above with an acid compound of phosphorous is:

Sulphonated diphenyl phosphoric acid

It is very important to note that the processes involving the admixture of the novel inhibiting compound with another coating composition provides a more satisfactory bond or means of attachment of such other composition to metal surfaces. Obviously, if an ingredient of a coating composition does in itself react with and adhere to a metal surface, then such composition carrying this ingredient will become permanently adhered to the metal when applied.

As stated in the general outline of this invention, it is sometimes desirable that the derivatives of the acids of phosphorus to be used as the present novel inhibitor be of such nature that in contact with water they will yield a solution having a pH of below 7, preferably below 6 and above 4. Such materials are of sufficiently acidic nature as to react chemically with metal surfaces to form adherent protective coatings.

Because of the very nature of the acids of phosphorus and their derivatives it has been found that such agents as moisture, which ordinarily promotes corrosion, will, when attacking the metal surface treated by the present novel coating method, produce an accelerated reaction of such derivatives of phosphoric acids used in the coating with the metal to form a thin protective layer of organic metal phosphate, such as organic iron phosphate when used with steel or the like.

From the above description it has been shown that the compounds described, when incorporated in a coating composition, are all effective and desirable corrosion and oxidation inhibitors.

The present invention is not limited to the specific examples given above, as they are to be construed as specific embodiments of the present invention and not limitations of the scope thereof. Likewise the quantities of materials employed and the procedure of preparation may be widely varied without departing from the scope of this invention, nor is it intended to limit the use of any member of the new class of inhibitors to any particular coating composition. The present invention is limited solely by the claims attached as a part of this specification.

The amount of the above-described derivatives of acids of phosphorus required for my purpose depends upon the nature of the compound, the kind of use, and the character of the vehicle. In the case of certain of the more active esters, a very low percentage is sufficient, e. g. from 0.01 to 0.25%, and for most purposes, amounts up to about 5% are desirable. Usually only a minor amount need be used; but in the case of certain of the materials, for example, the ester-salts (particularly those also useful as pigments or fillers) much higher proportions, up to 90% or more, may be found useful.

Other modes of applying the principle of my invention may be employed instead of the one explained, change being made as regards the materials employed, provided the ingredients stated by any of the following claims or the equivalent of such stated ingredients be employed.

I, therefore, particularly point out and distinctly claim as my invention:

1. A corrosion inhibitor for metals comprising an ester of an acid of phosphorus miscible in oil and which will react in contact with water to yield a solution having a pH below 7 and an oil vehicle therefor.

2. A corrosion inhibitor for metals comprising a derivative of an acid of phosphorus having at least one of the acid hydrogen atoms of the acid replaced by an ester group and at least one of the acid hydrogen atoms replaced by an inorganic radicle, and an oil vehicle therefor.

3. A corrosion inhibitor for ferrous metals comprising an acid of phosphorus with at least one of its acid hydrogen atoms substituted by an aromatic hydrocarbon radicle and an oil vehicle, the resultant compound when contacted with water yielding a solution having a pH of from 4 to 6.

4. A corrosion inhibitor for metallic surfaces comprising a major proportion of an oil of the character commonly applied to metallic surfaces for preserving the same, and a minor amount on the order of about 0.1% to about 5% of a derivative of an acid of phosphorus having at least one of the acid hydrogen atoms of the acid replaced by an ester radicle and at least one of the acid hydrogen atoms replaced by an inorganic radicle.

5. A corrosion inhibitor for metallic surfaces comprising a major proportion of an oil of the character commonly applied to metallic surfaces for preserving the same, and a minor amount on the order of about 0.1% to about 5% of a derivative of an acid of phosphorus having all of the acid hydrogen atoms of the acid replaced by at least one member of the following group: ester radicles, inorganic radicles.

6. A corrosion inhibitor for ferrous metals comprising a minor amount of a compound of the class consisting of esters and ester-salts of acids of phosphorus in an oil vehicle.

7. A corrosion inhibitor for metal surfaces comprising a minor amount of a compound of the class consisting of esters and ester-salts of acids of phosphorus in a mineral oil vehicle.

8. A corrosion inhibitor for metal surfaces comprising an aliphatic ester of an acid of phosphorus in an oil vehicle.

9. A corrosion inhibitor for metal surfaces comprising an ester of an acid of phosphorus in an oil vehicle.

10. A corrosion inhibitor for metal surfaces comprising an aromatic ester of an acid of phosphorus in an oil vehicle.

CARL F. PRUTTON.